US006340538B1

United States Patent
King

(10) Patent No.: US 6,340,538 B1
(45) Date of Patent: Jan. 22, 2002

(54) MODULAR BATTERY TRAY ASSEMBLY

(75) Inventor: Gary Jack King, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/511,466

(22) Filed: Feb. 23, 2000

(51) Int. Cl.[7] ................................................ H01M 2/10
(52) U.S. Cl. .......................... 429/96; 429/97; 429/99; 429/100; 429/159; 429/163; 429/183; 429/186
(58) Field of Search ........................... 429/96, 97, 99, 429/100, 159, 163, 183, 186

(56) References Cited

U.S. PATENT DOCUMENTS

| | | | | |
|---|---|---|---|---|
| 4,429,025 A | * | 1/1984 | Stow | 429/97 |
| 5,403,679 A | * | 4/1995 | Stone | 429/99 |
| 5,639,571 A | * | 6/1997 | Waters et al. | 429/71 |

* cited by examiner

Primary Examiner—Gabrielle Brouillette
Assistant Examiner—Angela J. Martin
(74) Attorney, Agent, or Firm—Margaret A. Dobrowitsky

(57) ABSTRACT

A battery tray assembly is described which has a bottom member and four side walls which are attached to the bottom member thereby forming an enclosure; the enclosure adapted to removably receive a battery therein; one of the walls having integral battery holddown members to retain the battery in position when placed in the enclosure; spaced adjacent to one of the walls a slot for snuggly retaining an electrical control module for modulating the engine performance; a manually operable cover which securely fits over the enclosure and the module when it is placed in the slot, the cover when open facilitates inspection or removal of the battery from the enclosure; integral with the slot for the control module a second enclosure formed of a second bottom member and four sides, the second enclosure adapted to snuggly retain a second module for modulating the performance of the engine; and a second cover being manually removable which fits over the second enclosure.

7 Claims, 4 Drawing Sheets

MODULAR BATTERY TRAY ASSEMBLY

FIELD OF THE INVENTION

The present invention pertains battery tray assemblies that facilitate holding and inspection of batteries when they are placed in vehicles.

BACKGROUND OF THE INVENTION

A number of applications require the use of batteries to provide energy for a particular need such as an electric vehicle or an internal combustion engine vehicle that requires electrical capabilities. In electrically powered vehicles, for example, several battery modules typically from about 12 volts per module and larger are connected to form a higher voltage battery pack. Such vehicle packs must not only be sturdy to resist damage on impact, but must also be capable of readily accepting the battery so that it may be inspected or removed.

It is also desirable to have near the battery employed in vehicular applications an electrically controllable module that modulates the performance of the engine that should likewise be protected and be near the battery itself.

SUMMARY OF THE INVENTION

Described is a battery tray assembly comprising a bottom member and four side walls which are attached to the bottom member thereby forming an enclosure; the enclosure adapted to removably receive a battery therein; one of the walls having integral battery holddown members to retain the battery in position when placed in the enclosure; spaced adjacent to one of the walls a slot for snuggly retaining an electrical control module for modulating the engine performance; and a manually operable cover which securely fits over the enclosure and the module when it is placed in the slot, the cover when open facilitates inspection or removal of the battery from the enclosure.

Preferably integral with the slot for the control module is a second enclosure formed of second bottom member and four sides, the second enclosure adapted to snuggly retain a second module for modulating the performance of the engine and a second cover being manually removable which fits over the second enclosure.

DESCRIPTION OF PREFERRED EMBODIMENTS

The present invention pertains to modular battery tray assembly with the capability of storing an electrical control module which modulates the performance of the engine. Integral with and adjacent to the battery tray assembly is a second enclosure for a second electrical module for controlling the performance of the engine.

Figure 1:
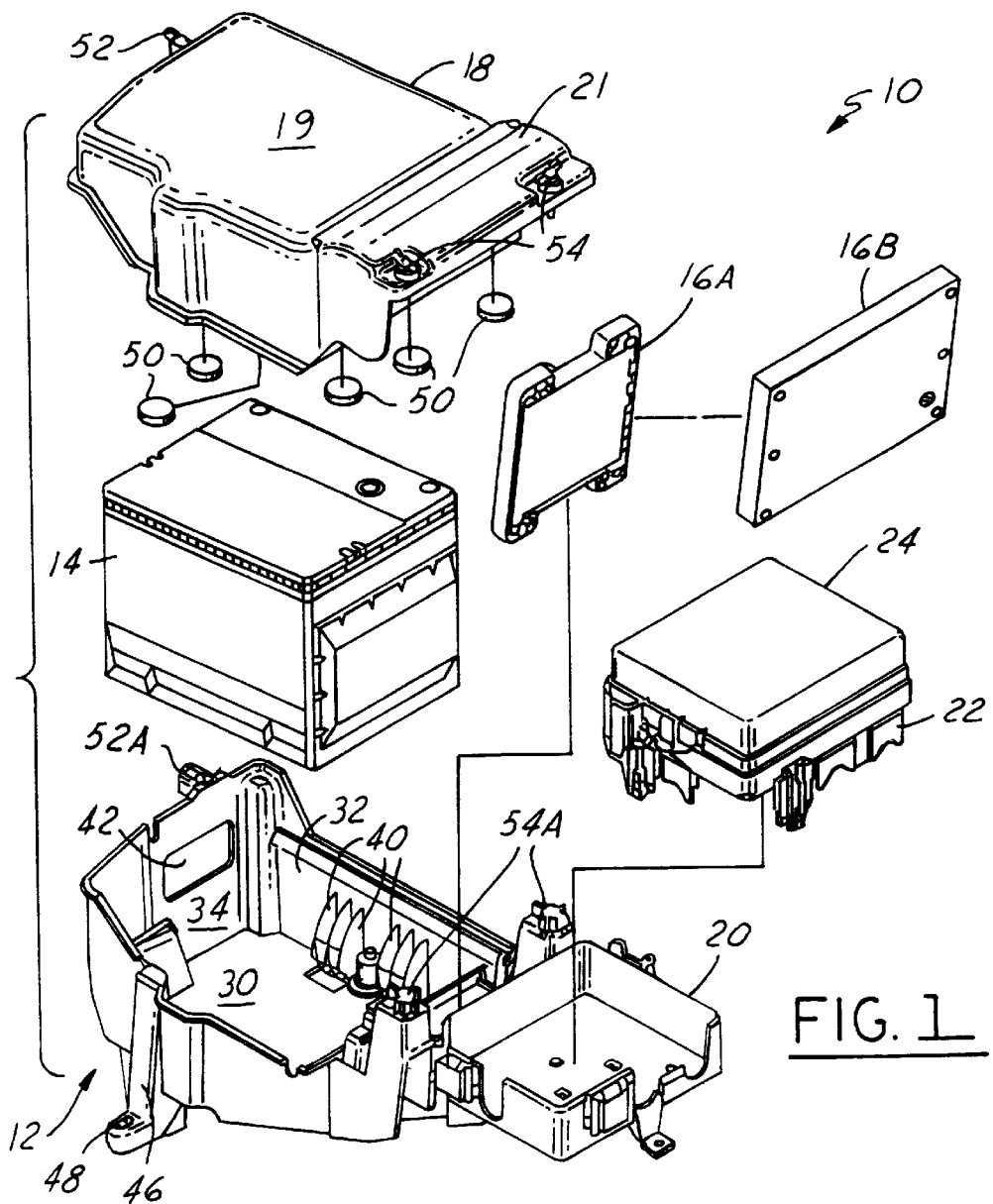
FIG. 1 is an exploded view of the modular tray assembly in conjunction with an electrical control module for modulating the engine performance and integral with the battery tray assembly an additional enclosure for an additional electrical module for modulating the performance of the engine.
Figure 2:
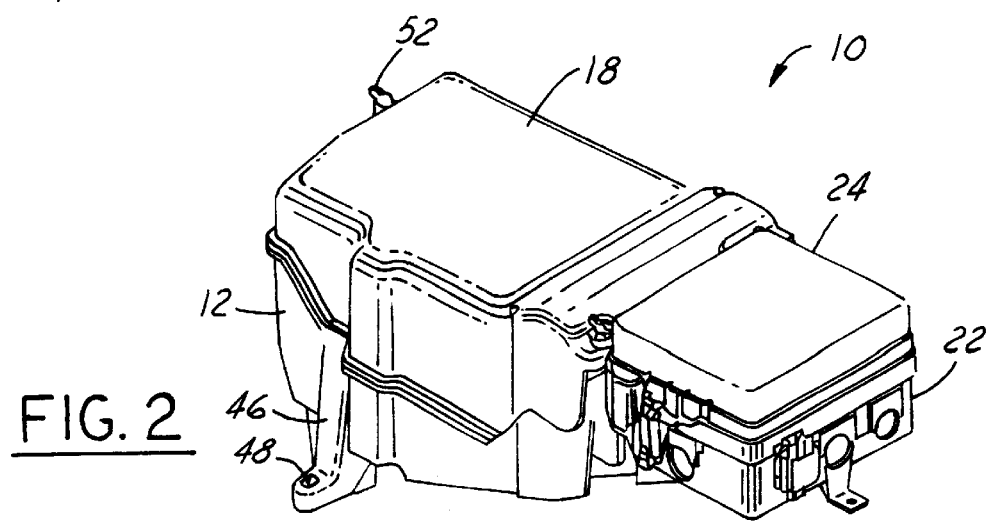
FIG. 2 is a view of the modular battery tray assembly with the covers thereon.

FIG. 1 shows the modular battery tray assembly 10 with the bottom portion 12 which is an enclosure in which the battery 14 is placed together with the control module 16A or 16B together with the cover therefore 18. Attached to the battery tray assembly bottom portion is a second enclosure 20 in which snugly fits an additional electrical control module 22 with its associated cover 24. The full battery tray assembly 10 with all of the components therein are shown in the fully assembled position in FIG. 2.

The battery tray assembly 12 has a bottom portion 30 and four sides 32, 34, 36, and 38. The battery 14 is held in place by integral battery holddown members 40 which is comprised of a series of upstanding rib members. Side wall 34 has an aperture 42 through which one can observe the battery 14 and its attend operations, which may be indicated on the side of the battery. Wall member 36 has upstanding leg 44 which is comprised of a portion of plastic molded to facilitate the placement of the battery assembly in a vehicle. The battery tray assembly may be secured to a vehicle floor by support member 46 with aperture 48 for insertion of a threaded member such as a bolt to the floor (not shown). The cover 18 has compression members 50 to snugly hold the battery in position and prevent its movement during operation of the vehicle. The cover 18 may be hinged (not shown) or may be held in place by threaded members 52 and 54. The threaded members are aligned with female thread receiving means 52A and 54A.

The cover has a main section 19 which fits over the battery 14. The cover likewise has an extension thereof 21 which covers the electrical control module 16A or 16B.

Figure 9:
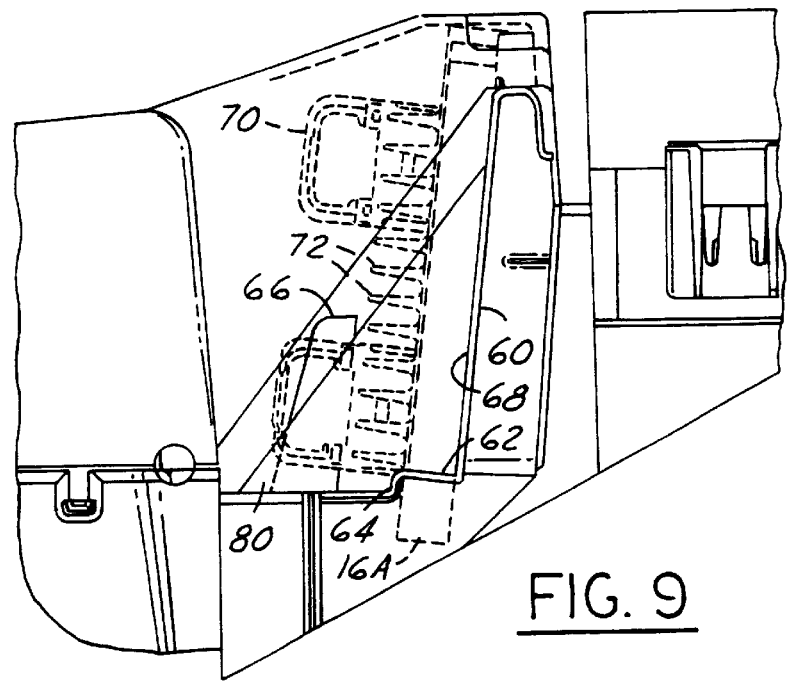
FIG. 9 is a side view of FIG. 8.

Since the battery tray assembly is preferably prepared from a plastic substrate such as polypropylene, polyethylene, polyvinylchloride, with or without supporting glass fibers, the assembly can be molded to desired shape to fit within a desired location within a vehicle. The electronic control module 16A or 16B fits within a slot area formed by back wall member 60 (FIG. 9) and a base therefore 62 with an extended lip thereof 64. One type of module 16A is available from Delphi Automotive Systems, Inc. while a second alternative 16B is available from Motorola Co. Upright stanchions 66 are placed near the front side 68 of wall 60. In this fashion, the electronic control module abuts wall 68 being held in place between the wall 68 and the upright stanchions 66. Electrical components 70 are portions of the electronic control module 16A and are shown for illustrative purposes only. Grooved members 72 which are portions of the electronic control module are heat dissipating members. It can therefore be said that either electronic control module 16A or B fits within the slot formed of a front wall member 68 and upright stanchions 66.

The electronic control modules 16A or 16B extend over floor member 80 which is the base on which the stanchions 66 fit. For support purposes due to the size of the battery tray assembly, support members 86 are molded from the bottom of floor member 80.

Figure 7:
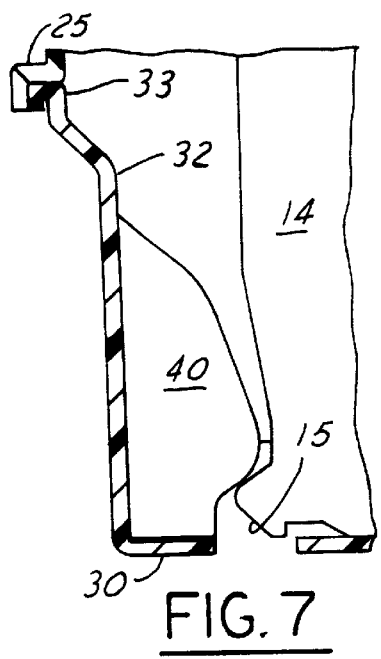
FIG. 7 is a side sectional view of the battery holddown member with the battery placed in position.

As can be seen from FIG. 7, the battery 14 snugly fits with the battery holder members 40 which are molded from the side wall 32. The lip or extension 33 of the side wall 22 is sized to snugly fit with the cover segment 25. Battery extension member 15 snugly fits in place with the battery holder members 40.

Figure 3:
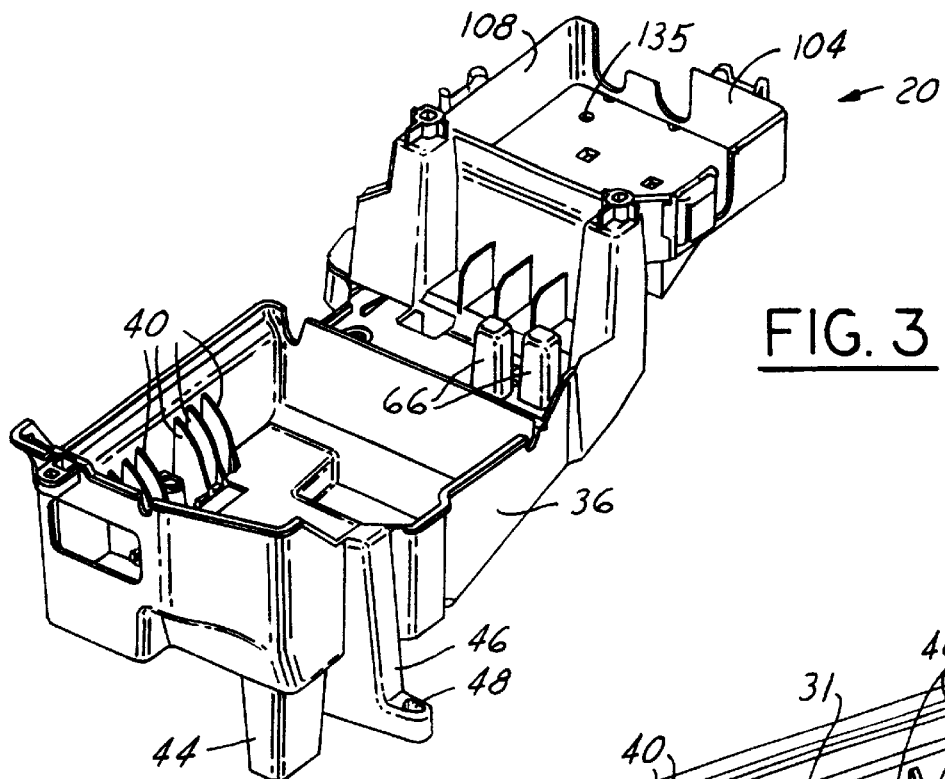
FIG. 3 is a side view of the battery tray assembly without the covers attached.
Figure 4:
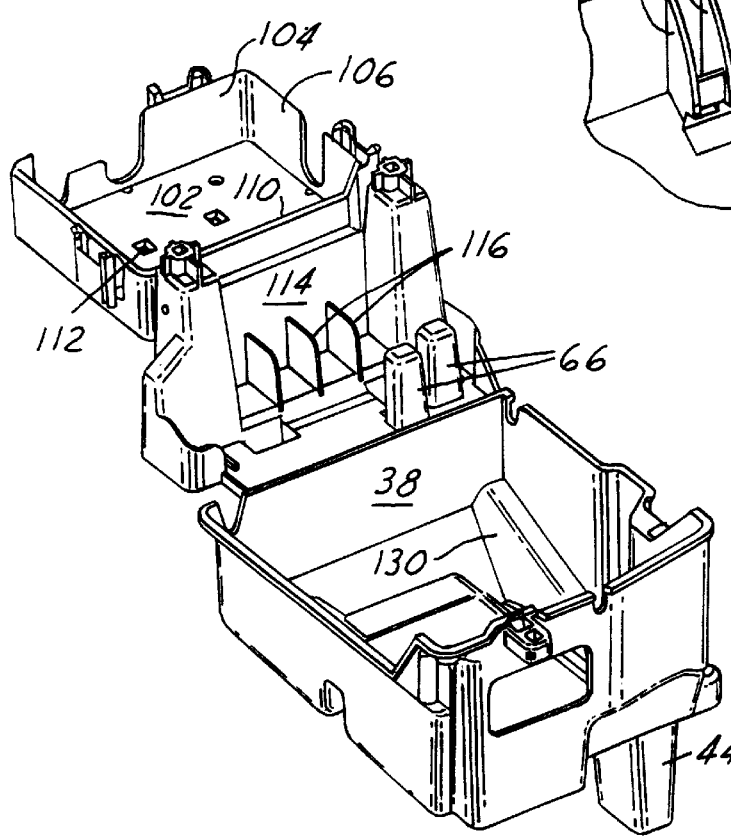
FIG. 4 is a second side view of the battery tray assembly of the present invention.
Figure 5:
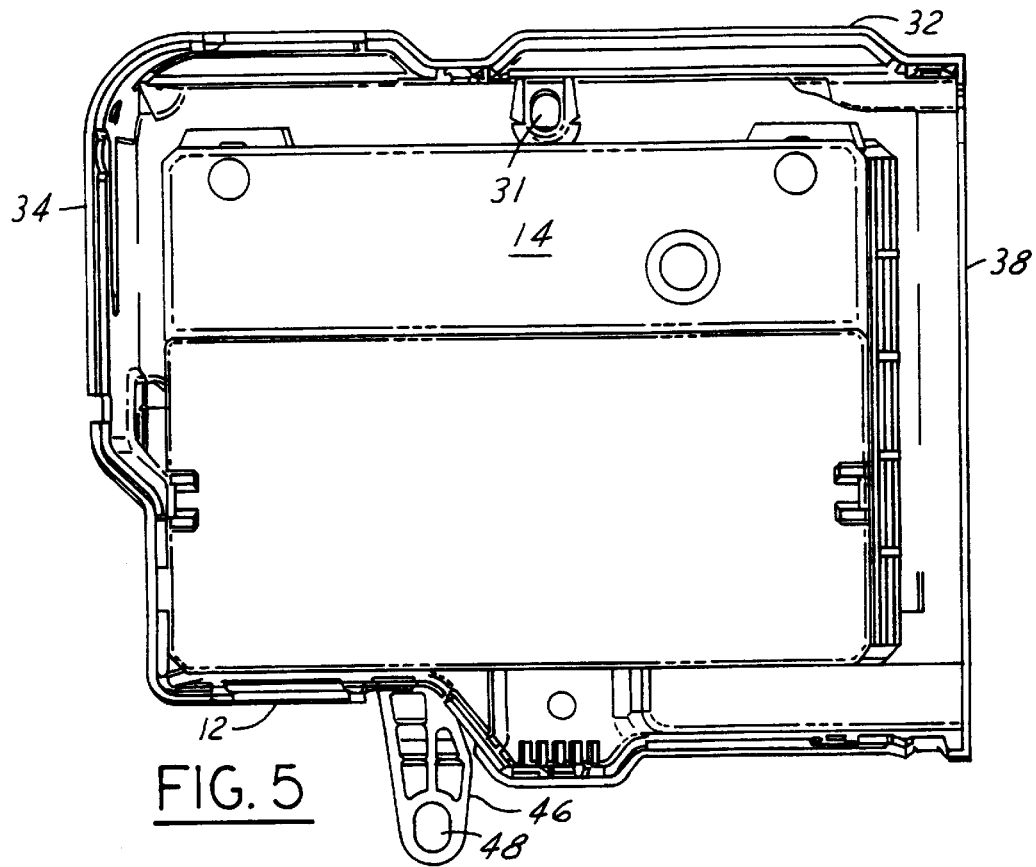
FIG. 5 is a top view of the battery tray assembly with the battery placed therein.
Figure 8:
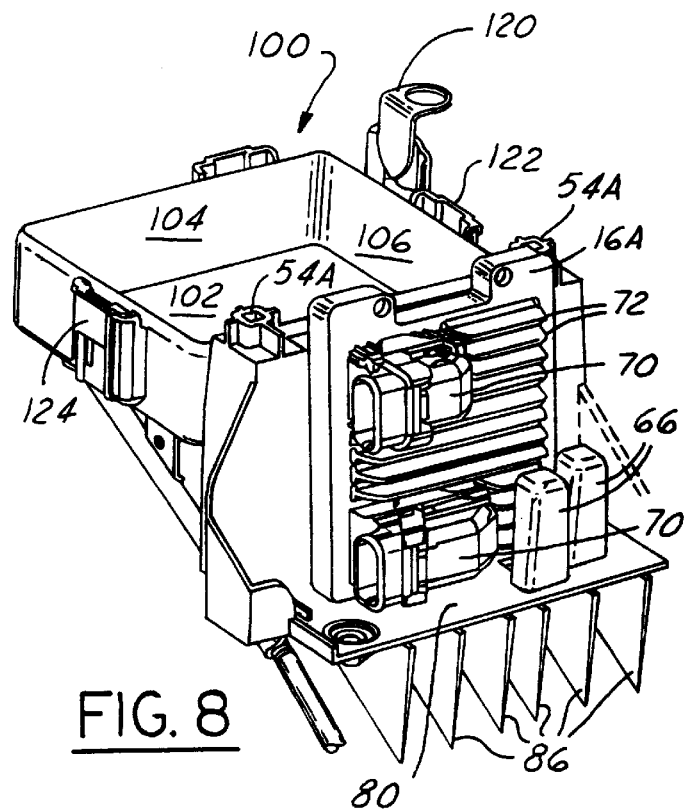
FIG. 8 is a front view of the electrical control module in place adjacent to the battery assembly tray.

Immediately adjacent the slot in which the electronic control module fits is an additional enclosure 20 (FIG. 3) (100 in more detailed FIG. 8). It is comprised of bottom member 102 which has four side walls 104, 106, 108, and 110. The floor member 102 has molded legs 112 extending therefrom (FIG. 4). Side wall 110 has an extension thereof 114 from which are upright support segments 116. The second electronic control module (not shown since it is under cover by) snugly fits within the enclosure formed of the bottom member 110 and the side walls 104, 106, 108, and 110. The second electronic control member is arranged so that it can be aligned with locking holding member 120 (FIG. 8) through which the cover 24 is aligned with the locking member 120. Side members 122 and 124 facilitate placement of the second control module into an aligned position in the enclosure. The battery tray assembly may be bolted via threaded apertures 135 in the floor of the vehicle by threaded bolts going through the floor of the second enclosure (FIG. 3).

Figure 3A:
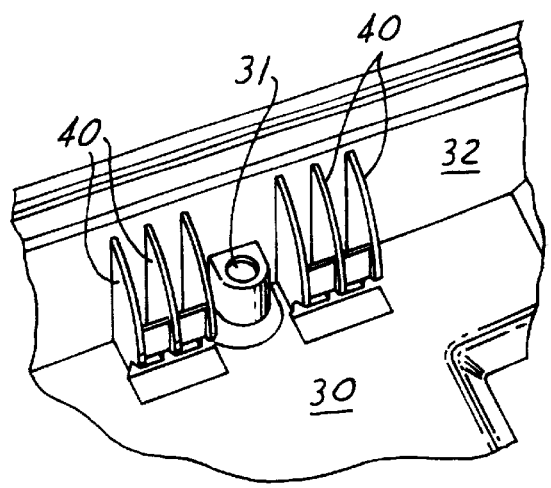
FIG. 3A is a sectional view of the integral battery holddown members which retain the battery in position.

The battery tray assembly likewise may be threaded to the floor through aligned aperture 31 (FIG. 3A).

Figure 6:
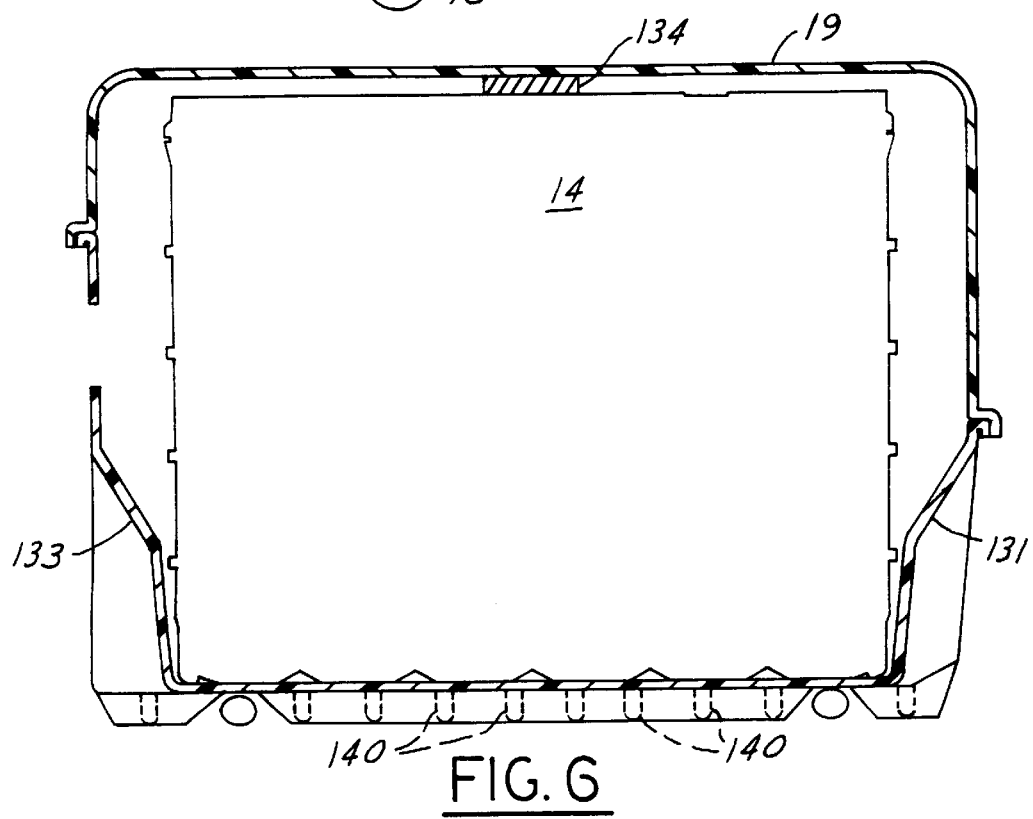
FIG. 6 is a side cross-sectional view of the battery assembly tray with the battery placed therein.

FIG. 6 is a side cross-sectional view of the battery tray assembly with the battery 14 in place and battery secured in position by retention members 131 and 133. To snugly hold the battery in place, compression pad 134 is attached to main cover wall 19. To give support to the housing of the battery assembly structure, ribs 140 are molded as an integral part of the overall structure.

The battery and control modules are placed into a battery tray assembly that contains initial locating and retention features 40 (FIG. 3). Battery is located by gusset 130 which prevents the battery from shifting within the assembly (FIG. 4). The battery retention holding members 40 are relatively easy to produce and reduce die cost in the manufacture of the battery assembly tray. This also facilitates a reduction of production life maintenance costs of the dies.

The battery tray assembly is designed to accommodate the two different styles of control modules 16A and 16B. The Delphi control module 16A drops into the slot whereas the Motorola control module 16B fits within the battery tray floor and is retained in position by the stanchions 66. The battery and the control module are secured and protectively enclosed by cover 18 which may be hinged or not into place containing compression pads 50 to provide load and thereby securing the components in place with threaded members 52 and 54.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing form the spirit or scope of the invention.

What is claimed is:

1. A battery tray assembly comprising a bottom member and four side walls which are attached to the bottom member thereby forming an enclosure; the enclosure adapted to removably receive a battery therein; one of the walls having integral battery holddown members to retain the battery in position when placed in the enclosure; spaced adjacent to one of the walls a slot for snugly retaining an electrical control module; a manually operable cover which securely fits over the enclosure and the module when it is placed in the slot, the cover when open facilitates inspection or removal of the battery from the enclosure; integral with the slot for the control module a second enclosure formed of a second bottom member and four sides, the second enclosure adapted to snugly retain a second module; and a second cover being manually removable which fits over the second enclosure.

2. A battery tray assembly comprising a bottom member and four side walls which are attached to the bottom member thereby forming an enclosure; the enclosure adapted to removably receive a battery therein; one of the walls having integral battery holddown members to retain the battery in position when placed in the enclosure; spaced adjacent to one of the walls a slot for snugly retaining an electrical control module; a manually operable cover which securely fits over the enclosure and the module when it is placed in the slot, the cover when open facilitates inspection or removal of the battery from the enclosure; and an upright support member attached to a vehicle to secure the assembly to the vehicle by threaded engagement members.

3. The assembly of claim 2 further comprising threaded engagement members which receive threaded bolts to secure the cover in place.

4. A battery tray assembly comprising a bottom member and four side walls which are attached to the bottom member thereby forming an enclosure; the enclosure adapted to removably receive a battery therein; one of the walls having integral battery holddown members to retain the battery in position when placed in the enclosure; spaced adjacent to one of the walls a slot for snugly retaining an electrical control module; a manually operable cover which securely fits over the enclosure and the module when it is placed in the slot, the cover when open facilitates inspection or removal of the battery from the enclosure; an upright support member attached to a vehicle to secure the assembly to the vehicle by threaded engagement members and upright stanchions which securely hold the electrical control module in place.

5. The assembly of claim 1 further comprising upright stanchions which securely hold the electrical control module in place.

6. The assembly of claim 1 further comprising threaded engagement members which receive threaded bolts to secure the cover in place.

7. The assembly of claim 1 further comprising an upright support member attached to a vehicle to secure the assembly to the vehicle by threaded engagement members.

* * * * *